United States Patent
Bhalla et al.

(10) Patent No.: US 12,363,619 B2
(45) Date of Patent: Jul. 15, 2025

(54) NETWORK FUNCTION SELECTION FOR USER EQUIPMENT VIA A GATEWAY NETWORK NODE

(71) Applicant: Nokia Technologies Oy, Espoo (FI)

(72) Inventors: Manish Bhalla, Bengaluru (IN); Sung Hwan Won, Flower Mound, TX (US)

(73) Assignee: Nokia Technologies Oy, Espoo (FI)

( * ) Notice: Subject to any disclaimer, the term of this patent is extended or adjusted under 35 U.S.C. 154(b) by 387 days.

(21) Appl. No.: 17/932,129

(22) Filed: Sep. 14, 2022

(65) Prior Publication Data
US 2024/0089838 A1      Mar. 14, 2024

(51) Int. Cl.
*H04W 48/16*      (2009.01)
*H04L 41/34*      (2022.01)

(52) U.S. Cl.
CPC ............ *H04W 48/16* (2013.01); *H04L 41/34* (2022.05)

(58) Field of Classification Search
CPC ..... H04W 48/16; H04W 48/12; H04W 88/16; H04W 48/18; H04L 41/34
See application file for complete search history.

(56) References Cited

U.S. PATENT DOCUMENTS

| | | |
|---|---|---|
| 2018/0270712 A1 | 9/2018 | Faccin et al. |
| 2018/0367980 A1 | 12/2018 | Lee et al. |
| 2019/0124561 A1 * | 4/2019 | Faccin .................. H04W 48/18 |
| 2019/0357129 A1 | 11/2019 | Park et al. |
| 2021/0258430 A1 * | 8/2021 | Saji ....................... H04M 15/60 |
| 2021/0360742 A1 * | 11/2021 | Liao ...................... H04W 60/00 |
| 2022/0167167 A1 | 5/2022 | Jost et al. |
| 2022/0322221 A1 * | 10/2022 | Ianev .................... H04W 76/11 |

FOREIGN PATENT DOCUMENTS

| | | | | |
|---|---|---|---|---|
| CN | 106954233 A | | 7/2017 | |
| WO | WO-2021200239 A1 | * | 10/2021 | ........... H04W 36/08 |
| WO | 2022/082628 A1 | | 4/2022 | |
| WO | 2022/151153 A1 | | 7/2022 | |

OTHER PUBLICATIONS

"3rd Generation Partnership Project; Technical Specification Group Radio Access Network; NG-RAN; NG Application Protocol (NGAP) (Release 17)", 3GPP TS 38.413, V17.1.1, Jun. 2022, pp. 1-575.

(Continued)

*Primary Examiner* — Dhaval V Patel
(74) *Attorney, Agent, or Firm* — Nokia Technologies Oy

(57) ABSTRACT

Methods, systems, apparatuses, and computer program products provide network function selection for user equipment via a gateway network node. In an implementation, a single-network slice selection assistance information (S-NSSAI) list is received from a user equipment (UE). Additionally, it is determined whether a network node does not support a non-access stratum node selection function for the UE. Based on a determination that the network node does not support the non-access stratum node selection function for the UE, an initial UE message configured with an information element for the S-NSSAI list is generated, and the initial UE message is caused to be transmitted to a gateway network node to select a core network function for the UE.

14 Claims, 7 Drawing Sheets

(56) References Cited

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 17)", 3GPP TS 36.300, V17.1.0 , Jun. 2022, pp. 1-401.
"NNSF for HeNB GW deployment scenario", 3GPP TSG-RAN3 Meeting #64, R3-091478, Huawei, May 4-8, 2009, 5 pages.
"3rd Generation Partnership Project; Technical Specification Group Core Network and Terminals; Numbering, addressing and identification; (Release 17)", 3GPP TS 23.003, V17.6.0, Jun. 2022, pp. 1-147.
"S-NSSAI based SMF Selection", Cisco, Retrieved on Sep. 5, 2022, Webpage available at : https://www.cisco.com/c/en/us/td/docs/wireless/ucc/amf/2022-01/config-and-admin/b_ucc-5g-amf-config-and-admin-guide_2022-01/m_nsssai_smf_selection.pdf.
"3rd Generation Partnership Project; Technical Specification Group Services and System Aspects; System architecture for the 5G System (5GS); Stage 2 (Release 17)", 3GPP TS 23.501, V17.5.0, Jun. 2022, pp. 1-568.
"5G RAN and 5GC Network Slice Signaling", Tech Play on, Retrieved on Sep. 5, 2022, Webpage available at : https://www.techplayon.com/5g-ran-and-5gc-network-slice-signaling/.
Extended European Search Report received for corresponding European Patent Application No. 23196458.6, dated Feb. 12, 2024, 10 pages.

\* cited by examiner

NETWORK FUNCTION SELECTION FOR USER EQUIPMENT VIA A GATEWAY NETWORK NODE

TECHNOLOGICAL FIELD

An example embodiment of the present disclosure generally relates to communication systems and, more particularly, to network functions provided by a communication network.

BACKGROUND

Fourth generation (4G) wireless mobile telecommunications technology, also known as Long Term Evolution (LTE) technology, was designed to provide high-capacity mobile multimedia with high data rates and machine type communications. Next generation or fifth generation (5G) technology is intended to achieve even higher data rates via enhanced Mobile Broadband (eMBB), massive Machine-Type Communication (mMTC), Ultra-Reliable and Low-Latency Communications (URLLC), etc. Third generation partnership project (3GPP) 5G technology is a next generation of radio systems and network architecture that can deliver extreme broadband and ultra-robust, low latency connectivity.

BRIEF SUMMARY

Methods, apparatuses and computer program products are provided in accordance with an example embodiment to provide network function selection for user equipment via a gateway network node.

In an example embodiment, an apparatus includes at least one processor and at least one memory storing instructions that, when executed by the at least one processor, cause the apparatus at least to receive a single-network slice selection assistance information (S-NSSAI) list from a user equipment (UE). In one or more embodiments, the instructions further cause, when executed by the at least one processor, the apparatus to determine whether a network node does not support a non-access stratum node selection function for the UE. In one or more embodiments, based on a determination that the network node does not support the non-access stratum node selection function for the UE, the instructions further cause, when executed by the at least one processor, the apparatus to generate an initial UE message configured with an information element for the S-NSSAI list, and/or cause the initial UE message to be transmitted to a gateway network node to select a core network function for the UE.

In one or more embodiments, the apparatus is embodied by the network node. Additionally, in one or more embodiments, the gateway network node is implemented between the network node and the core network function.

In one or more embodiments, the apparatus is embodied by the network node and the network node is configured as a home next generation radio access network (NG-RAN) node.

In one or more embodiments, the gateway network node is configured as a radio access network (RAN) node gateway.

In one or more embodiments, the gateway network node is configured as a Femto gateway.

In one or more embodiments, the gateway network node is configured as a home next generation radio access network (NG-RAN) node gateway.

In one or more embodiments, the core network function is an access and mobility management function (AMF) for the UE.

In another example embodiment, a method is provided. The method includes receiving an S-NSSAI list from a UE. In one or more embodiments, the method also includes determining whether a network node does not support a non-access stratum node selection function for the UE. Based on a determination that the network node does not support the non-access stratum node selection function for the UE, in one or more embodiments, the method also includes generating an initial UE message configured with an information element for the S-NSSAI list, and/or causing the initial UE message to be transmitted to a gateway network node to select a core network function for the UE.

In one or more embodiments, the gateway network node is implemented between the network node and the core network function. In one or more embodiments, the network node is configured as a home NG-RAN node. In one or more embodiments, the gateway network node is configured as a RAN node gateway. In one or more embodiments, the gateway network node is configured as a Femto gateway. In one or more embodiments, the gateway network node is configured as a home NG-RAN node gateway. In one or more embodiments, the core network function is an AMF for the UE.

In one or more embodiments, the gateway network node is configured as a RAN node gateway, and the causing the initial UE message to be transmitted to the gateway network node includes causing the initial UE message to be transmitted to the RAN node gateway to select a core network function for the UE.

In one or more embodiments, the gateway network node is configured as a Femto gateway, and the causing the initial UE message to be transmitted to the gateway network node includes causing the initial UE message to be transmitted to the Femto gateway to select a core network function for the UE.

In one or more embodiments, the gateway network node is configured as a home NG-RAN node gateway, and the causing the initial UE message to be transmitted to the gateway network node includes causing the initial UE message to be transmitted to the home NG-RAN node gateway to select a core network function for the UE.

In another example embodiment, a computer program product is provided. The computer program product includes at least one non-transitory computer readable storage medium having computer-executable program code instructions stored therein with the computer-executable program code instructions including program code instructions configured, upon execution, to receive an S-NSSAI list from a UE. In one or more embodiments, the computer-executable program code instructions are also configured to determine whether a network node does not support a non-access stratum node selection function for the UE. Based on a determination that the network node does not support the non-access stratum node selection function for the UE, in one or more embodiments, the computer-executable program code instructions are also configured to generate an initial UE message configured with an information element for the S-NSSAI list, and/or cause the initial UE message to be transmitted to a gateway network node to select a core network function for the UE.

In one or more embodiments, the gateway network node is implemented between the network node and the core network function. In one or more embodiments, the network node is configured as a home NG-RAN node. In one or more embodiments, the gateway network node is configured as a RAN node gateway. In one or more embodiments, the gateway network node is configured as a Femto gateway. In one or more embodiments, the gateway network node is configured as a home NG-RAN node gateway. In one or more embodiments, the core network function is an AMF for the UE.

In yet another example embodiment, an apparatus is provided that includes means for receiving an S-NSSAI list from a UE. In one or more embodiments, the apparatus of this example embodiment also includes means for determining whether a network node does not support a non-access stratum node selection function for the UE. Based on a determination that the network node does not support the non-access stratum node selection function for the UE, in one or more embodiments, the apparatus of this example embodiment also includes means for generating an initial UE message configured with an information element for the S-NSSAI list, and/or means for causing the initial UE message to be transmitted to a gateway network node to select a core network function for the UE.

In one or more embodiments, the apparatus is embodied by the network node. Additionally, in one or more embodiments, the gateway network node is implemented between the network node and the core network function. In one or more embodiments, the apparatus is embodied by the network node and the network node is configured as a home NG-RAN node. In one or more embodiments, the gateway network node is configured as a RAN node gateway. In one or more embodiments, the gateway network node is configured as a Femto gateway. In one or more embodiments, the gateway network node is configured as a home NG-RAN node gateway. In one or more embodiments, the core network function is an AMF for the UE.

In one or more embodiments, the gateway network node is configured as a RAN node gateway, and the means for causing the initial UE message to be transmitted to the gateway network node includes means for causing the initial UE message to be transmitted to the RAN node gateway to select a core network function for the UE.

In one or more embodiments, the gateway network node is configured as a Femto gateway, and the means for causing the initial UE message to be transmitted to the gateway network node includes means for causing the initial UE message to be transmitted to the Femto gateway to select a core network function for the UE.

In one or more embodiments, the gateway network node is configured as a home NG-RAN node gateway, and the means for causing the initial UE message to be transmitted to the gateway network node includes means for causing the initial UE message to be transmitted to the home NG-RAN node gateway to select a core network function for the UE.

In an example embodiment, an apparatus includes at least one processor and at least one memory storing instructions that, when executed by the at least one processor, cause the apparatus at least to receive, from a RAN node, a first initial UE message configured with an information element for an S-NSSAI list associated with a UE. In one or more embodiments, the instructions further cause, when executed by the at least one processor, the apparatus to select a core network function for the UE based on the information element for the S-NSSAI list. In one or more embodiments, the instructions further cause, when executed by the at least one processor, the apparatus to cause a second initial UE message to be transmitted to the selected core network function.

In one or more embodiments, the instructions further cause, when executed by the at least one processor, the apparatus to select the core network function by performing a non-access stratum node selection function (NNSF) for the UE based on the information element for the S-NSSAI list.

In one or more embodiments, the core network function is an AMF.

In one or more embodiments, the apparatus is embodied by a network node that is implemented between the RAN node and the core network function.

In one or more embodiments, the apparatus is embodied by a network node that is configured as a RAN node gateway.

In one or more embodiments, the apparatus is embodied by a network node that is configured as a Femto gateway.

In one or more embodiments, the apparatus is embodied by a network node that is configured as a home NG-RAN node gateway.

In one or more embodiments, the RAN node is configured as a home NG-RAN node.

In one or more embodiments, the RAN node is configured as a Femto base station.

In another example embodiment, a method is provided. The method includes receiving, from a RAN node, a first initial UE message configured with an information element for an S-NSSAI list associated with a UE. In one or more embodiments, the method also includes selecting a core network function for the UE based on the information element for the S-NSSAI list. In one or more embodiments, the method also includes causing a second initial UE message to be transmitted to the selected core network function.

In one or more embodiments, the selecting the core network function includes performing an NNSF for the UE based on the information element for the S-NSSAI list.

In one or more embodiments, the core network function is an AMF.

In one or more embodiments, a network node is implemented between the RAN node and the core network function. In one or more embodiments, the network node is configured as a RAN node gateway. In one or more embodiments, the network node is configured as a Femto gateway. In one or more embodiments, the network node is configured as a home NG-RAN node gateway. In one or more embodiments, the RAN node is configured as a home NG-RAN node. In one or more embodiments, the RAN node is configured as a Femto base station.

In one or more embodiments, the RAN node is configured as a home NG-RAN node, and the receiving the first initial UE message includes receiving the first initial UE message from the home NG-RAN node.

In one or more embodiments, the RAN node is configured as a Femto base station, and the receiving the first initial UE message includes receiving the first initial UE message from the Femto base station.

In another example embodiment, a computer program product is provided. The computer program product includes at least one non-transitory computer readable storage medium having computer-executable program code instructions stored therein with the computer-executable program code instructions including program code instructions configured, upon execution, to receive, from a RAN node, a first initial UE message configured with an information element for an S-NSSAI list associated with a UE. In one or more embodiments, the computer-executable program code instructions are also configured to select a core network function for the UE based on the information element for the S-NSSAI list. In one or more embodiments, the computer-executable program code instructions are also configured to cause a second initial UE message to be transmitted to the selected core network function.

In one or more embodiments, the computer-executable program code instructions are also configured to select the core network function by performing an NNSF for the UE based on the information element for the S-NSSAI list.

In one or more embodiments, the core network function is an AMF.

In one or more embodiments, a network node is implemented between the RAN node and the core network function. In one or more embodiments, the network node is configured as a RAN node gateway. In one or more embodiments, the network node is configured as a Femto gateway. In one or more embodiments, the network node is configured as a home NG-RAN node gateway. In one or more embodiments, the RAN node is configured as a home NG-RAN node. In one or more embodiments, the RAN node is configured as a Femto base station.

In yet another example embodiment, an apparatus is provided that includes means for receiving, from a RAN node, a first initial UE message configured with an information element for an S-NSSAI list associated with a UE. In one or more embodiments, the apparatus of this example embodiment also includes means for selecting a core network function for the UE based on the information element for the S-NSSAI list. In one or more embodiments, the apparatus of this example embodiment also includes means for causing a second initial UE message to be transmitted to the selected core network function.

In one or more embodiments, the means for selecting the core network function includes means for performing an NNSF for the UE based on the information element for the S-NSSAI list.

In one or more embodiments, the core network function is an AMF.

In one or more embodiments, a network node is implemented between the RAN node and the core network function. In one or more embodiments, the network node is configured as a RAN node gateway. In one or more embodiments, the network node is configured as a Femto gateway. In one or more embodiments, the network node is configured as a home NG-RAN node gateway. In one or more embodiments, the RAN node is configured as a home NG-RAN node. In one or more embodiments, the RAN node is configured as a Femto base station.

In one or more embodiments, the RAN node is configured as a home NG-RAN node, and the means for receiving the first initial UE message includes means for receiving the first initial UE message from the home NG-RAN node.

In one or more embodiments, the RAN node is configured as a Femto base station, and the means for receiving the first initial UE message includes means for receiving the first initial UE message from the Femto base station.

BRIEF DESCRIPTION OF THE DRAWINGS

Figure 1:
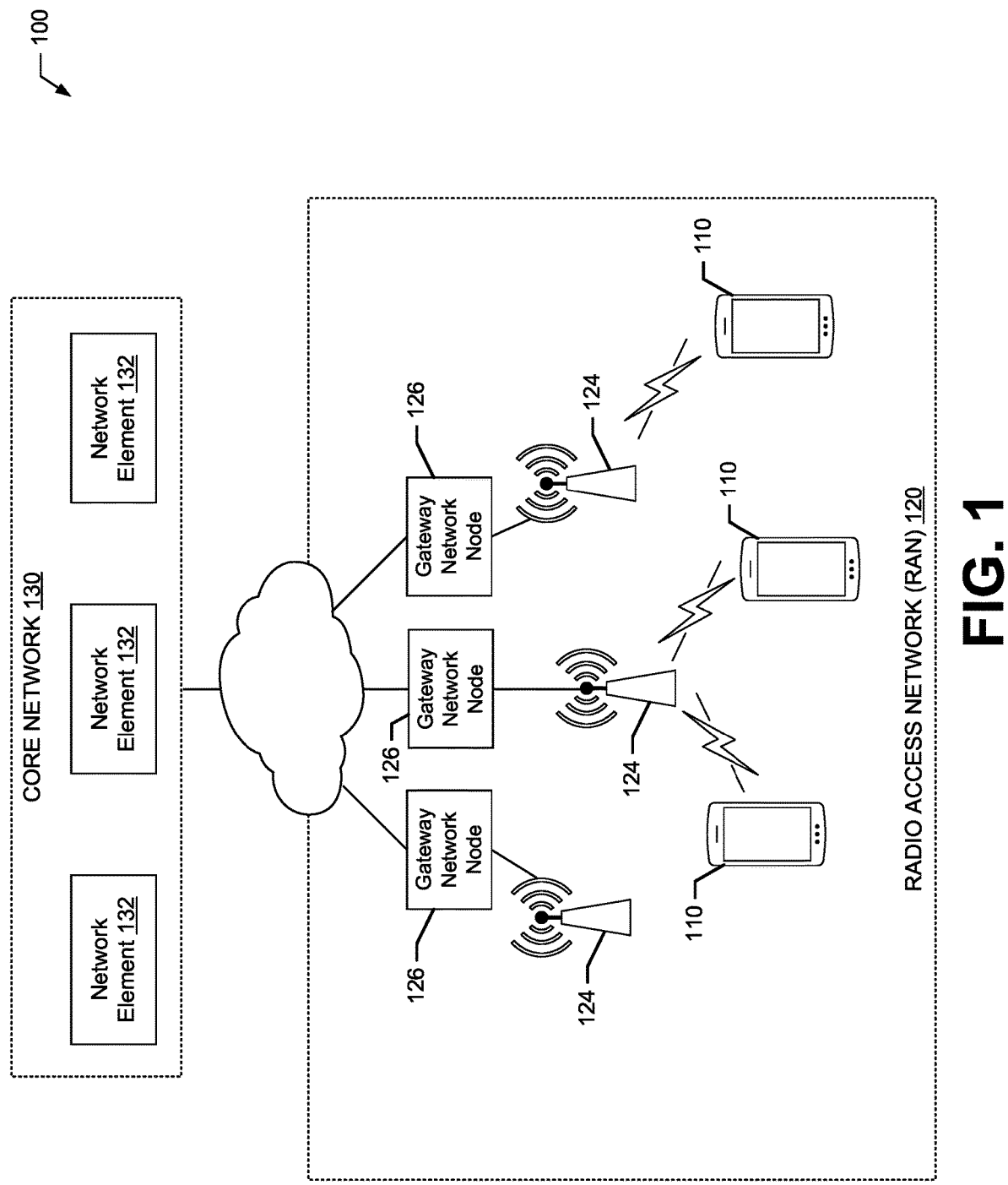
Figure 2:
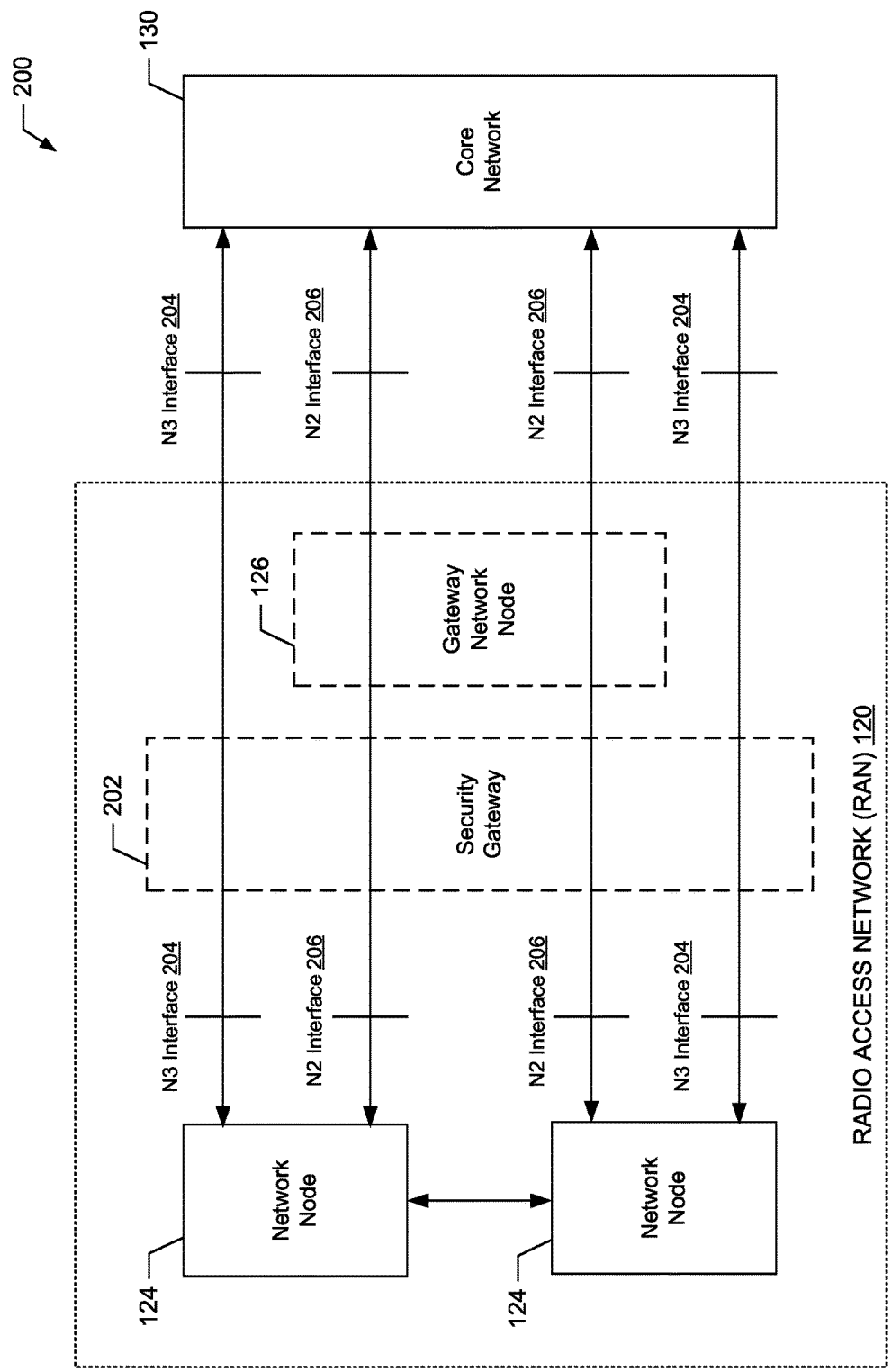
Figure 3:
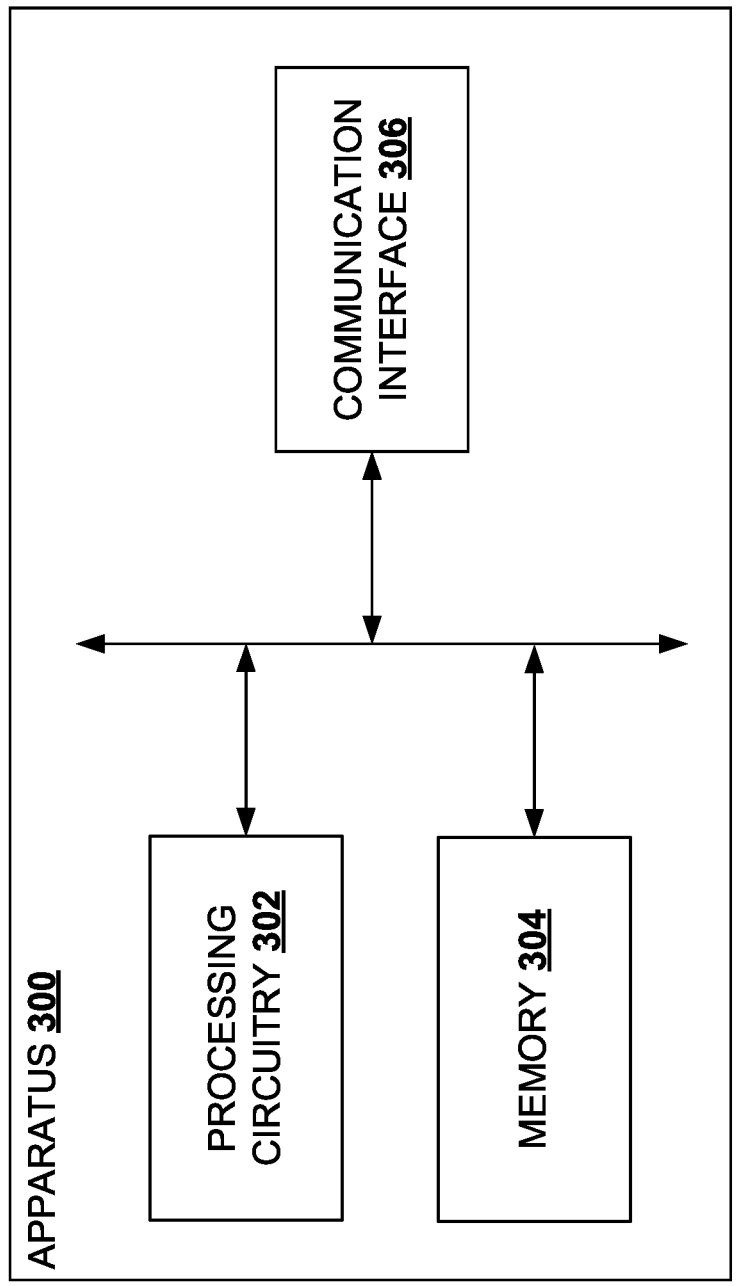
Figure 4:
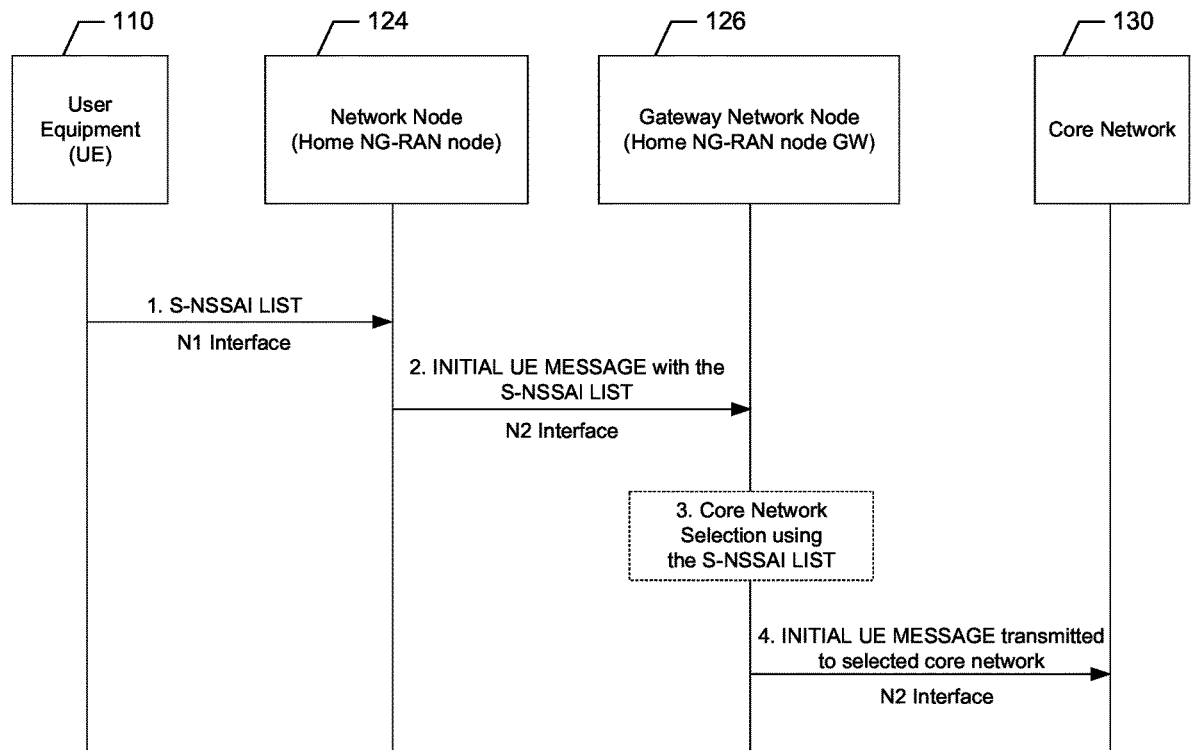
Figure 5:
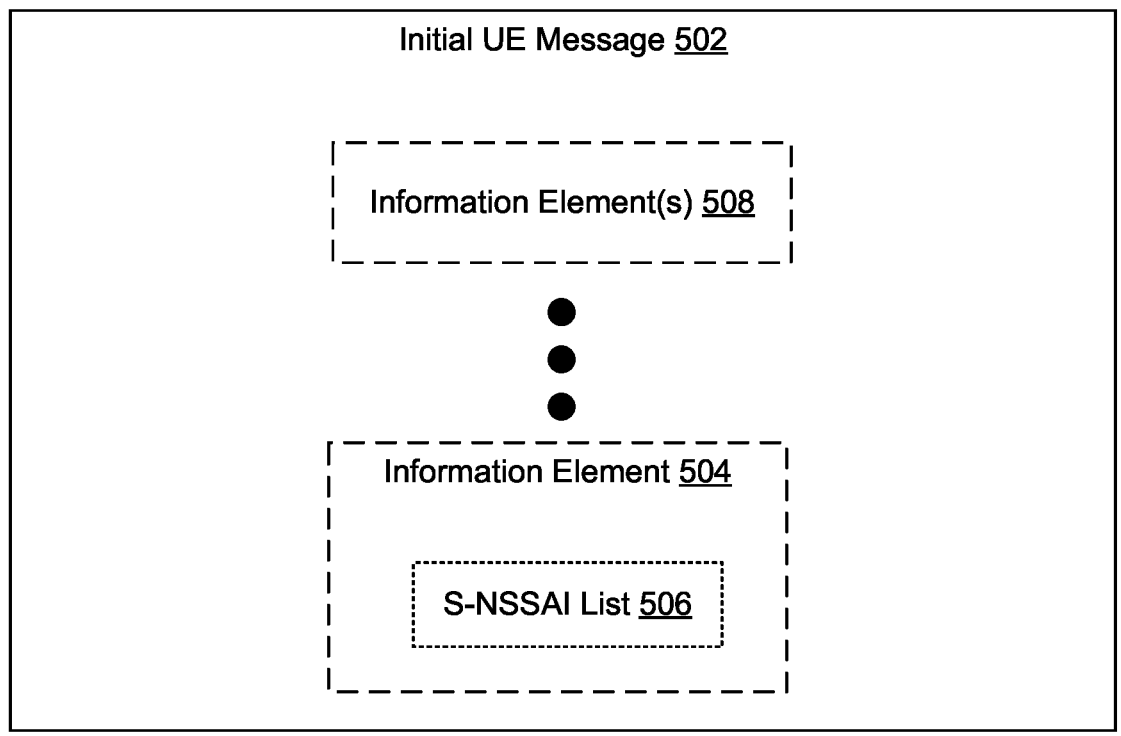
Figure 6:
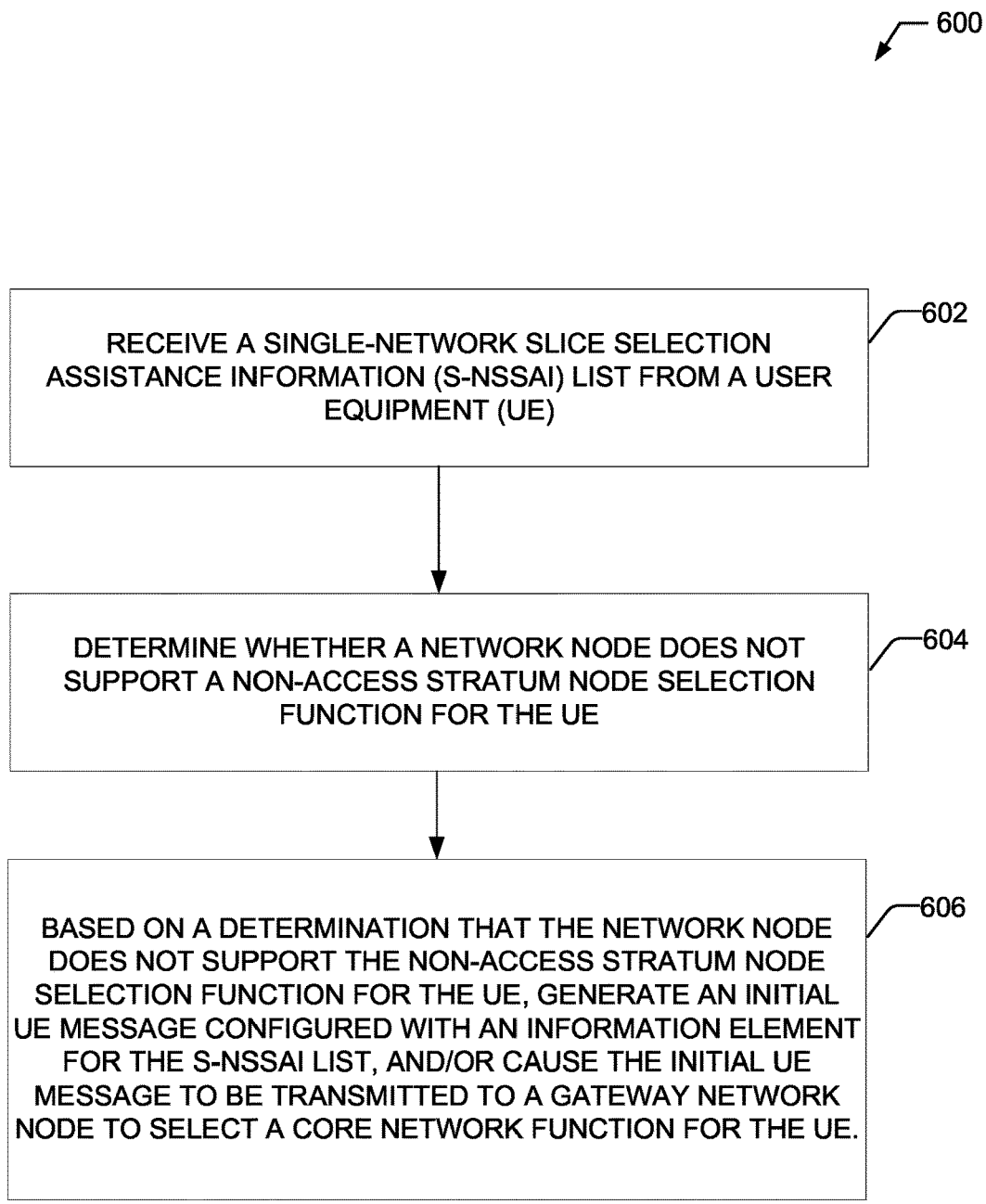
Figure 7:
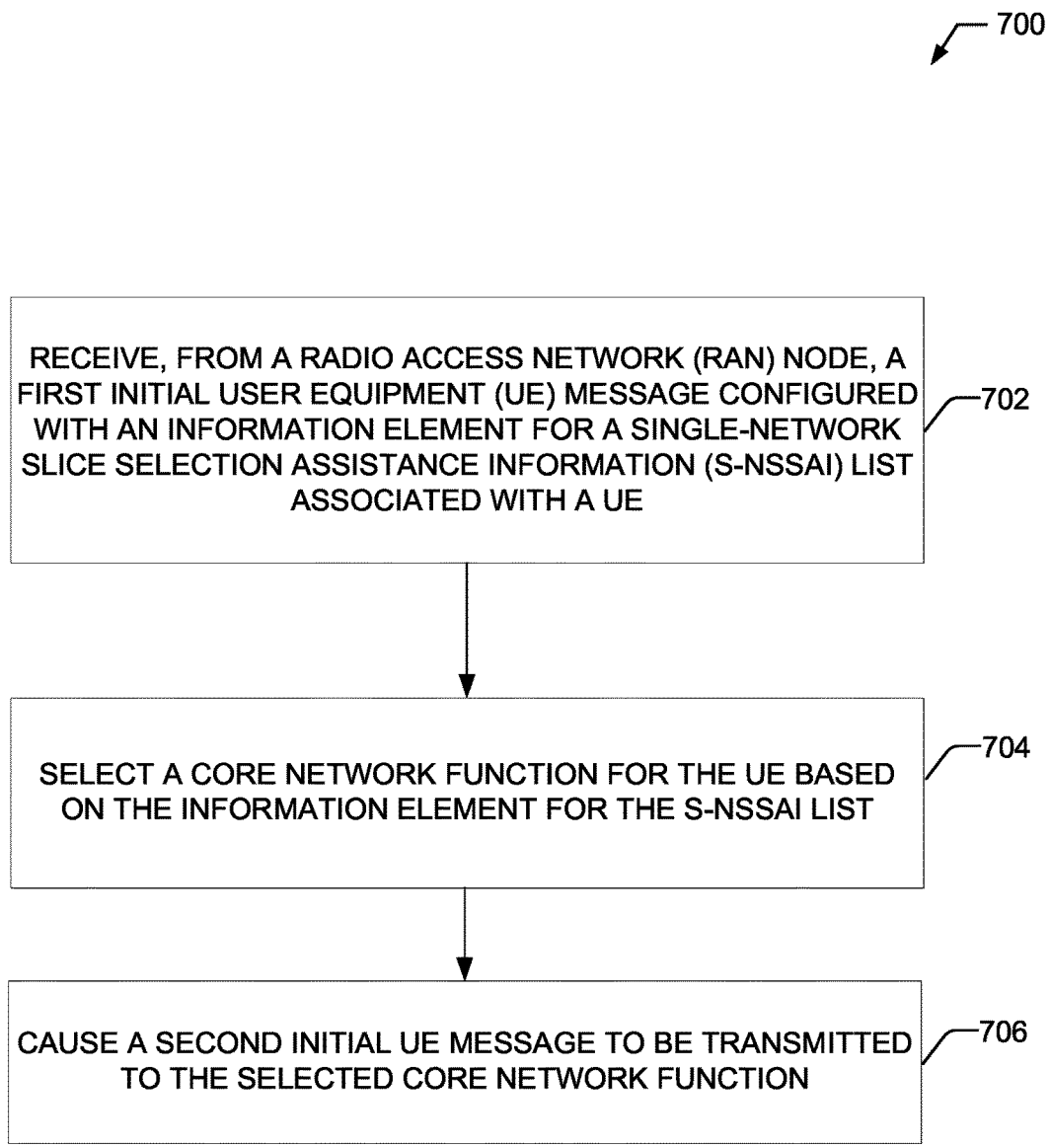

Having thus described certain example embodiments of the present disclosure in general terms, reference will now be made to the accompanying drawings, which are not necessarily drawn to scale, and wherein:

FIG. 1 depicts an example communication network in which implementations in accordance with one or more example embodiments of the present disclosure;

FIG. 2 another example communication network in which implementations in accordance with one or more example embodiments of the present disclosure;

FIG. 3 is a block diagram of an apparatus configured in accordance with one or more example embodiments of the present disclosure;

FIG. 4 illustrates example transmissions between user equipment, a network node, a gateway network node, and a core network in accordance with one or more example embodiments of the present disclosure;

FIG. 5 illustrates an example, initial user equipment message in accordance with one or more example embodiments of the present disclosure;

FIG. 6 illustrates a flowchart illustrating operations performed, such as by the apparatus of FIG. 3, in order to provide network function selection for user equipment using a network node and via a gateway network node, in accordance with one or more example embodiments of the present disclosure; and FIG. 7 illustrates a flowchart illustrating operations performed, such as by the apparatus of FIG. 3, in order to provide network function selection for user equipment via a gateway network node, in accordance with one or more example embodiments of the present disclosure.

DETAILED DESCRIPTION

Some embodiments of the present disclosure will now be described more fully hereinafter with reference to the accompanying drawings, in which some, but not all, embodiments of the present disclosure are shown. Indeed, various embodiments of the present disclosure may be embodied in many different forms and should not be construed as limited to the certain embodiments set forth herein; rather, these certain embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with an embodiment of the present disclosure. Thus, use of any such terms should not be taken to limit the spirit and scope of one or more embodiments of the present disclosure.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As defined herein, a "computer-readable storage medium," which refers to a physical storage medium (e.g., volatile or non-volatile memory device), may be differentiated from a "computer-readable transmission medium," which refers to an electromagnetic signal.

Communication networks (e.g., wireless communication networks) employ a variety of technologies and use various standards throughout the world. There are generally agreed upon standards that promote some degree of unity between networks, with some of those standards being defined by 3GPP (3$^{rd}$ Generation Partnership Project), such as the Third Generation (3G), a Fourth Generation (4G), and/or a next generation (e.g., Fifth Generation, or 5G) network. 5G is the fifth generation of the technology standard for broadband cellular networks. These standards provide an architecture through which user equipment (UE) can communicate with networks and other UE devices Certain example embodiments will be illustrated herein in conjunction with example communication systems and associated techniques to provide network function selection for user equipment via a gateway network node of a communication network. It should be understood, however, that the scope of the claims is not limited to particular types of communication networks, communication systems, and/or processes disclosed. An example embodiment can be implemented in a terminal device (e.g., a user equipment) or a network (e.g., a communication network) of a communication system, using alternative processes and operations. For example, although illustrated in the context of wireless cellular systems utilizing 3GPP system elements such as a 3GPP next generation core network, the disclosed embodiment can be adapted in a straightforward manner to a variety of other types of communication systems. Additionally, while the present disclosure may describe certain embodiments in conjunction with a 5G communications system, other embodiments also apply to and comprise other networks and network technologies, such as 3G, 4G, Long Term Evolution (LTE), 6G, etc. without limitation.

In accordance with an illustrative embodiment implemented in a 5G communication system environment, one or more 3GPP technical specifications (TS) and technical reports (TR) provide further explanation of user equipment and core network elements/entities/functions and/or operations performed by the user equipment and the core network elements/entities/functions, e.g., 3GPP TS 23.003, 3GPP TS 36.300, 3GPP TS 38.413, etc. Other 3GPP TS/TR documents provide other conventional details that one of ordinary skill in the art will realize. However, while an illustrative embodiment is well-suited for implementation associated with the above-mentioned 3GPP standards for 5G, an alternative embodiment is not necessarily intended to be limited to any particular standards.

In certain communication systems, a next generation-radio access network (NG-RAN) node (e.g., a home NG-RAN node) can obtain a network function identifier from information received from a UE. For example, a UE can send a radio resource control (RRC) setup complete message to an NG-RAN node. The RRC setup complete message can include one or more single-network slice selection assistance information (S-NSSAIs). Based on the RRC setup complete message, the NG-RAN node can select an access and mobility management function (AMF) for the UE based on the one or more S-NSSAIs. Additionally, the NG-RAN node can transmit an initial UE message to the selected AMF and/or can transmit an RRC Reject message to the UE. However, in certain scenarios for a communication system, an NG-RAN node may not support a non-access stratum node selection function (NNSF) for the UE. Additionally or alternatively, one or more other network nodes located between an NG-RAN node and a core network associated with one or more network function (e.g., AMF, etc.) may be unaware of S-NSSAI information provided by a UE. As such, the one or more other network nodes located between the NG-RAN node and the core network may be unable to properly route a UE message to an AMF supporting the one or more S-NSSAIs.

Accordingly, described herein are apparatuses, methods, and computer program products for providing network function selection for user equipment via a gateway network node by a communication network to resolve some or all of the described limitations of current communication networks and/or current network protocols. Such methods, apparatuses, and computer program products are thus described that provide improved accessibility and/or selection of network functions associated with a communication network for user equipment. Furthermore, a number of computing resources and/or processing tasks for user equipment to access a communication network and/or employ network functions for the communication network can be reduced. Efficiency and/or network connectivity for a communication network can also be improved. For example, overall network signaling can be reduced to provide improved resiliency, security, network latency, and/or network speeds provided by a communication network.

The gateway network node can be implemented between an NG-RAN node and a core network associated with one or more network function (e.g., AMF, etc.). In various example embodiments, the gateway network node can be a radio access network (RAN) node gateway, a Femto gateway (e.g., a 5G Femto gateway), a home next generation RAN (NG-RAN) node gateway, a home G node B gateway (Home gNB GW or HgNB GW), or another type of gateway network node. In various embodiments, the NG-RAN node can relay information provided by a UE to the gateway network node. For example, the NG-RAN node can relay one or more S-NSSAIs provided by a UE to the gateway network node. In various embodiments, the NG-RAN node can relay the information (e.g., the one or more S-NSSAIs) based on a determination that the NG-RAN node does not support an NNSF for the UE. Based on the information (e.g., the one or more S-NSSAIs) relayed by the NG-RAN node, the gateway network node can select a network function for the UE. Additionally, the gateway network node can transmit a UE message (e.g., an initial UE message) to the selected network function. The selected network function can be a core network function such as AMF or another type of network function associated with the core network.

In an example embodiment, the NG-RAN node can modify an initial UE message to include an information element for the information (e.g., the one or more S-NSSAIs) provided by the UE. The initial UE message can be, for example, an initial layer 3 message. The NG-RAN node can transmit the initial UE message (e.g., a first initial UE message) configured with the information element for the information (e.g., the one or more S-NSSAIs) to the gateway network node. Additionally, the gateway network node can employ the information element for the information (e.g., the one or more S-NSSAIs) to select the network function for the UE. The gateway network node can also transmit a second initial UE message to the selected network function.

Referring now to FIG. 1, an example communication network 100 is illustrated according to one or more embodiments of the present disclosure. Communication network 100 (also referred to as a wireless communication network, a cellular network, or a mobile network) is a type of network where at least at least one link is wireless, and provides voice and/or data services to a plurality of devices. Communication network 100 can be a 5G network. Additionally or alternatively, at least a portion of the communication network can be a 3G network, a 4G network, an LTE network, a 6G network, and/or another type of network.

FIG. 1 depicts the communication network 100 in which implementations in accordance with an example embodiment of the present disclosure may be performed. The depiction of the communication network 100 in FIG. 1 is not intended to limit or otherwise confine the example embodiment described and contemplated herein to any particular configuration of elements or systems, nor is it intended to exclude any alternative configurations or systems for the set of configurations and systems that can be used in connection with an example embodiment of the present disclosure. Rather, FIG. 1, and the communication network 100 disclosed therein is merely presented to provide an example basis and context for the facilitation of some of the features, aspects, and uses of the methods, apparatuses, and computer program products disclosed and contemplated herein. It will be understood that while many of the aspects and components presented in FIG. 1 are shown as discrete, separate elements, other configurations may be used in connection with the methods, apparatuses, and computer programs described herein, including configurations that combine, omit, and/or add aspects and/or components.

Communication network 100 is illustrated as providing communication services to UEs 110. UEs 110 can be enabled for voice services, data services, Machine-to-Machine (M2M) or Machine Type Communications (MTC) services, Internet of Things (IoT) services, and/or other services. Although the UEs 110 may be configured in a variety of different manners, the UEs 110 may respectively be embodied as a mobile terminal, such as a mobile phone, a smartphone, a pager, a mobile television, a gaming device, a laptop computer, a computer with a mobile broadband adapter, a camera, a tablet computer, a portable digital assistant (PDA), a communicator, pad, a wearable device, a headset, a touch surface, a video recorder, an audio/video player, radio, an electronic book, a positioning device (e.g., global positioning system (GPS) device), a virtual reality device, an augmented reality device, or any combination of the aforementioned, and other types of voice and text and multi-modal communications systems.

In the context of a 5G network, the communication network 100 can comprise a series of connected network devices and specialized hardware that is distributed throughout a service region, state, province, city, or country, and one or more network entities, which can be stored at and/or hosted by one or more of the connected network devices or specialized hardware. In some embodiments, a UE 110 can connect to a radio access network (RAN) 120, which can then relay the communications between the UE 102 and the core network 130. In some embodiments, the UE 110 can be in communication with the RAN 120, which can act as a relay between the UE 110 and other components or services of the core network 130. For instance, in some embodiments, the UE 110 can communicate with the RAN 120, which can in turn communicate with an AMF associated with the core network 130.

In one or more embodiments, the RAN 120 can communicate with UEs 110 over a radio interface. The RAN 120 can support Next Generation RAN (NG-RAN) access, Evolved-UMTS terrestrial Radio Access network (E-UTRAN) access, Wireless Local Area Network (WLAN) access, fixed access, satellite radio access, new Radio Access Technologies (RAT), and/or the like. To provide communication between the UE 110 and the core network 130, the RAN 120 includes one or more network nodes 124 and one or more gateway network nodes 126. In various embodiments, the one or more network nodes 124 can be dispersed over a geographic area. A respective network node 124 can include an entity that uses radio communication technology to communicate with one or more UEs 110 via one or more communication channels. For example, a respective network node 124 can be configured as a base station. In various embodiments, the one or more communication channels can be associated with a licensed spectrum. A respective network node 124 can also interface one or more UEs 110 with a core network 130. In one or more embodiments, a respective network node 124 can interface one or more UEs 110 with the core network 130 via a respective gateway network node 126 or a gateway network node 126 employed among two or more network nodes 124.

In one or more embodiments, the one or more network nodes 124 can be configured as one or more RAN nodes such as, for example, one or more NG-RAN nodes or one or more home NG-RAN nodes. In another embodiment, the one or more network nodes 124 can be configured as one or more Femto base stations such as, for example, one or more Femto 5G base stations or one or more Home gNBs.

The one or more gateway network nodes 126 can be one or more RAN node gateways such as, for example, one or more NG-RAN node gateways or one or more home NG-RAN node gateways. In another embodiments, the one or more gateway network nodes 126 can be configured as one or more Femto gateways such as, for example, one or more Femto 5G gateways or one or more Home gNB gateways.

In certain embodiments, the network nodes 124 in a NG-RAN can be referred to as gNodeBs (NR base stations) and/or ng-eNodeBs (LTE base stations supporting a 5G Core Network). In certain embodiments, the network nodes 124 are one or more Wireless Access Points (WAP) to enable a UE 110 to connect to a Local Area Network (LAN) through a wireless (radio) connection. For example, in certain embodiments, the network nodes 124 can employ radio communication technology to communicate with a UE 110 over an unlicensed spectrum and/or provides the UE 110 access to the core network 130. One example of a WAP is a Wi-Fi access point that operates on the 2.4 GHz or 5 GHz radio bands. Accordingly, the term "network node", in certain embodiments, can refer to an eNodeB, a gNodeB, an ng-eNodeB, a WAP, and/or the like.

In various embodiments, the UEs 110 can attach to a cell of the RAN 120 to access the core network 130. The RAN 120 can therefore represent a radio interface between UEs 110 and the core network 130. The core network 130 can be a portion of the communication network 100 that provides various services to UEs 110 connected by the RAN 120. One example of the core network 130 is a 5G Core (5GC) network according to the 3GPP. Another example of the core network 130 is an Evolved Packet Core (EPC) network according to the 3GPP.

The core network 130 includes network elements 132. The network elements 132 can include servers, devices, apparatuses, or equipment (including hardware) that provide services for the UEs 110. The network elements 132 can include one or more network functions. For example, the network elements 132, in a 5G network, can include Application Function (AF), AMF, a Session Management Function (SMF), a User Plane Function (UPF), a Policy Control Function (PCF), a Unified Data Management (UDM), Authentication Server Function (AUSF), Data Network (DN), e.g. operator services, Internet access or 3rd party services, Unstructured Data Storage Function (UDSF), Network Exposure Function (NEF), Network Repository Function (NRF), Network Slice Selection Function (NSSF), Session Management Function (SMF), Unified Data Repository (UDR), User Plane Function (UPF), UE radio Capability Management Function (UCMF), Network Data Analytics Function (NWDAF), Charging Function (CHF), and/ or the like. Additionally or alternatively, the network elements 132, in an EPC network, can include a Mobility Management Entity (MME), a Service Gateway (S-GW), a Packet Data Network Gateway (P-GW), and/or the like.

In some embodiments, the UEs 110 can include a single-mode or a dual-mode device such that the UEs 110 can be connected to the RAN 120. In some embodiments, the RAN 104 can be configured to implement one or more Radio Access Technologies (RATs), such as Bluetooth, Wi-Fi, and Global System for Mobile Communications (GSM), Universal Mobile Telecommunications Service (UMTS), LTE or 5G NR, among others, that can be used to connect the UE 102 to the core network 130. In some embodiments, the RAN 120 can comprise or be implemented using a chip, such as a silicon chip, in a respective UE 110 that can be paired with or otherwise recognized by a similar chip in the core network 130, such that the RAN 120 can establish a connection or line of communication between the respective UE 110 and the core network 130 by identifying and pairing the chip within the respective UE 110 with the chip within the core network 130.

In some embodiments, the communication network 100 or components thereof can be configured to communicate with a communication device (e.g., the UEs 110) or the like over multiple different frequency bands, e.g., FR1 (below 6 GHz), FR2 (mm Wave), other suitable frequency bands, sub-bands thereof, and/or the like. In some embodiments, the communication network 100 can comprise or employ massive Multiple Input and Multiple Output (massive MIMO) antennas. In some embodiments, the communication network 100 can comprise multi-user MIMO (MU-MIMO) antennas. In some embodiments, the communication network 100 can employ edge computing whereby the computing servers are communicatively, physically, computationally, and/or temporally closer to the communications device (e.g., UE 110) in order to reduce latency and data traffic congestion. In some embodiments, the communication network 100 can employ other technologies, devices, or techniques, such as small cell, low-powered RAN, beamforming of radio waves, WIFI-cellular convergence, Non-Orthogonal Multiple Access (NOMA), channel coding, and the like.

FIG. 2 illustrates an example communication network 200 according to one or more embodiments of the present disclosure. The communication network 200 can illustrate an exemplary architecture for interfacing the RAN 120 with the core network 130. As illustrated in FIG. 2, in one or more embodiments, the RAN 120 includes network nodes 124, a gateway network node 126 and a security gateway 202. It is to be appreciated that the RAN 120 can also include the one or more UEs 110.

The network nodes 124 can be communicatively coupled to core network 130 and the gateway network node 126 via a security gateway 202. The security gateway 202 can be configured to secure communication from the network nodes 124 and/or to the network nodes 124. For example, the security gateway 202 can be configured to authenticate the network nodes 124, to manage encrypted data communicated between the network nodes 124 and the core network 130, to provide the network nodes 124 access to the gateway network node 126, etc.

In various embodiments, the RAN 120 can employ an N3 interface 204 and/or a N2 interface 206 to facilitate communication between the RAN 120 and the core network 130. The N3 interface 204 can be an interface configured as a reference point between the network nodes 124 and the core network 130. In various embodiments, the N3 interface 204 can be configured for user plane tunneling and/or network node path switching during a handover between the network nodes 124 and the core network 130. The N2 interface 206 can be an interface configured as a reference point for control plane protocol between the network nodes 124 and the gateway network node 126. Additionally or alternatively, the N2 interface 206 can be an interface configured as a reference point for control plane protocol between the gateway network node 126 and the core network 130. In various embodiments, the N2 interface 206 can be configured for control plane signaling during a handover between the network nodes 124 and the gateway network node 126 and/or during a handover between the gateway network node 126 and the core network 130.

In one or more embodiments, network function selection for user equipment via a gateway network node can be provided within the communication network 100 and/or the communication network 200 by employing an apparatus 300 as depicted in FIG. 4. The apparatus 300 may be embodied by and/or incorporated into one or more network nodes (e.g., network node 124), one or more gateway network nodes (e.g., gateway network node 126), one or more UEs (e.g., UE 110), or any of the other devices discussed with respect to FIG. 1 or FIG. 2, such as another device incorporated or otherwise associated with the RAN 120 and/or the core network 130. Alternatively, the apparatus 300 may be embodied by another device, external to such devices. For example, the apparatus may be embodied by a computing device, such as a personal computer, a computer workstation, a server or the like, or by any of various mobile computing devices, such as a mobile terminal, including but not limited to a smartphone, a tablet computer, or the like, for example.

Regardless of the manner in which the apparatus 300 is embodied, the apparatus 300 of an example embodiment is configured to include or otherwise be in communication with a processing circuitry 302 and a memory 304. In some embodiments, the apparatus 300 is configured to additionally include or otherwise be in communication with a communication interface 306. In some embodiments, the processing circuitry 302 may be in communication with the memory 304 via a bus for passing information among components of the apparatus 300. The memory 304 may be non-transitory and may include, for example, one or more volatile and/or non-volatile memories. In other words, for example, the memory 304 may be an electronic storage device (e.g., a computer readable storage medium) comprising gates configured to store data (e.g., bits) that may be retrievable by a machine (e.g., a computing device like the processing circuitry 302). The memory 304 may be configured to store information, data, content, applications, instructions, or the like for enabling the apparatus 300 to carry out various functions in accordance with an example embodiment of the present disclosure. For example, the memory 304 could be configured to buffer input data for processing by the processing circuitry 302. Additionally or alternatively, the memory 304 could be configured to store instructions for execution by the processing circuitry 302.

As described above, the apparatus 300 may be embodied by a computing device. However, in some embodiments, the apparatus 300 may be embodied as a chip or chip set. In other words, the apparatus 300 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 300 may therefore, in some cases, be configured to implement an embodiment of the present disclosure on a single chip or as a single "system on a chip." As such, in some cases, a chip or chipset may constitute means for performing one or more operations for providing the functionalities described herein.

The processing circuitry 302 may be embodied in a number of different ways. For example, the processing circuitry 302 may be embodied as one or more of various hardware processing means including a processor, such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry 302 may include one or more processing cores configured to perform independently. A multi-core processor may enable multiprocessing within a single physical package. Additionally or alternatively, the processing circuitry 302 may include one or more processors configured in tandem via the bus to enable independent execution of instructions, pipelining and/or multithreading.

In an example embodiment, the processing circuitry 302 may be configured to execute instructions stored in the memory 304 or otherwise accessible to the processing circuitry 302. Alternatively or additionally, the processing circuitry 302 may be configured to execute hard coded functionality. As such, whether configured by hardware or software methods, or by a combination thereof, the processing circuitry 302 may represent an entity (e.g., physically embodied in circuitry) capable of performing operations according to an embodiment of the present disclosure while configured accordingly. Thus, for example, when the processing circuitry 302 is embodied as an ASIC, FPGA or the like, the processing circuitry 302 may be specifically configured hardware for conducting the operations described herein. Alternatively, as another example, when the processing circuitry 302 is embodied as an executor of software instructions, the instructions may specifically configure the processing circuitry 302 to perform the algorithms and/or operations described herein when the instructions are executed. However, in some cases, the processing circuitry 302 may be a processor of a specific device (e.g., a pass-through display or a mobile terminal) configured to employ an embodiment of the present disclosure by further configuration of the processing circuitry 302 by instructions for performing the algorithms and/or operations described herein. The processing circuitry 302 may include, among other things, a clock, an arithmetic logic unit (ALU) and logic gates configured to support operation of the processing circuitry 302.

The apparatus 300 may optionally include the communication interface 306. The communication interface 306 may be any means such as a device or circuitry embodied in either hardware or a combination of hardware and software that is configured to receive and/or transmit data from/to a network and/or any other device or module in communication with the apparatus. In this regard, the communication interface 306 may include, for example, an antenna (or multiple antennas) and supporting hardware and/or software for enabling communications with a wireless communication network. Additionally or alternatively, the communication interface 306 may include the circuitry for interacting with the antenna(s) to cause transmission of signals via the antenna(s) or to handle receipt of signals received via the antenna(s). In some environments, the communication interface 306 may alternatively or also support wired communication. As such, for example, the communication interface 306 may include a communication modem and/or other hardware/software for supporting communication via cable, digital subscriber line (DSL), universal serial bus (USB) or other mechanisms.

FIG. 4 illustrates example transmissions between the UE 110, the network node 124, the gateway network node 126, and the core network 130, according to one or more embodiments. In certain embodiments, the network node 124 can be configured as a home NG-RAN node and the gateway network node 126 can be configured as a home NG-RAN node GW. The below example transmissions provide the foreseen steps or messaging needed. In one or more embodiments, the example transmissions illustrate network function selection for the UE 110 via the gateway network node 126 to allow the UE 110 access to the core network 130 and/or one or more network functions of the core network 130.

In an embodiment, the UE 110 can send an S-NSSAI list (e.g., S-NSSAI LIST) to the network node 124, at 1. The S-NSSAI list can include one or more S-NSSAIs that respectively identify a network slice to potentially serve the UE 110. For example, when the UE 110 attempts to register to the core network 130, the UE 110 can request one or more network slices via the one or more S-NSSAIs included in the S-NSSAI list. A network slice can be a logical network that provides network capabilities and/or network characteristics associated with the core network 130, a control plane of the RAN 120, and/or a user plane network of the RAN 120. For example, a network slice can be a virtualized end-to-end network associated with the RAN 120 and the core network 130. In one or more embodiments, the UE 110 can send the S-NSSAI list to the network node 124 via an N1 interface.

Additionally, the network node 124, or another suitable network entity of the communication system, can transmit an initial UE message (e.g., INITIAL UE MESSAGE) to the gateway network node 126, at 2. The initial UE message can include the S-NSSAI list. For example, the network node 124 can receive the S-NSSAI list from the network node 124. Additionally, the network node 124 can determine whether the network node 124 does not support an NNSF for the UE 110. Based on a determination that the network node 124 does not support the NNSF for the UE 110, the network node 124 can generate the initial UE message configured with an information element for the S-NSSAI list. Additionally, the network node 124 can cause the initial UE message to be transmitted to the gateway network node 126. In one or more embodiments, the network node 124 can cause the initial UE message to be transmitted to the gateway network node 126 via an N2 interface.

In various embodiments, the gateway network node 126 can be implemented between the network node 124 and the core network 130. For example, the gateway network node 126 can be implemented between the network node 124 and a core network function of the core network 130. In certain embodiments, the network node 124 can be configured as a RAN node or a 5G Femto node (e.g., a 5G Femto base station). Additionally, the gateway network node 126 can be configured as a RAN node gateway or a 5G Femto gateway.

At 3, the gateway network node 126 can perform core network selection using the S-NSSAI list. For example, the gateway network node 126 can select a core network function for the UE 110 based on the information element for the S-NSSAI list. In certain embodiments, the gateway network node 126 can select the core network function by performing an NNSF for the UE 110 based on the information element for the S-NSSAI list. The core network function can be, for example, an AMF for the UE 110 and/or another type of network function.

Additionally, the gateway network node 126 can transmit an initial UE message (e.g., INITIAL UE MESSAGE) to the core network 130, at 4. For example, the gateway network node 126 can transmit the initial UE message to a selected core network (e.g., the core network 130) as determined by the core network selection at 3. In certain embodiments, the initial UE message transmitted by the network node 124 can be a first initial UE message and the initial UE message transmitted by the gateway network node 126 can be a second initial UE message. The second initial UE message can correspond to the first initial UE message. Alternatively, the second initial UE message can be a different than the first initial UE message. For example, in certain embodiments, the initial UE message transmitted by the gateway network node 126 can include an S-NSSAI that corresponds to the selected core network (e.g., rather than the S-NSSAI list). In another embodiment, the initial UE message transmitted by the gateway network node 126 can be configured without an information element for an S-NSSAI. In one or more embodiments, the gateway network node 126 can transmit the initial UE message to the core network 130 via an N2 interface.

FIG. 5 illustrates example initial UE message 502, according to one or more embodiments. The initial UE message 502 can be, for example, an initial UE message configured and/or transmitted by the network node 124. Furthermore, the initial UE message 502 can be, for example, an initial UE message received by the gateway network node 126. The initial UE message 502 can be configured an information element 504 for an S-NSSAI list 506. The information element 504 can be a group of information included within the initial UE message 502. For example, the initial UE message 502 can be a signaling message or a data flow configured with the information element 504 such that the group of information for the information element 504 is transmitted across a network interface (e.g., between the network node 124 and the gateway network node 126). The S-NSSAI list 506 can include one or more S-NSSAIs provided by the UE 110. In certain embodiments, the initial UE message 502 can additionally be configured with one or more other information elements 508. The one or more other information elements 508 can be associated with respective groups of other information related to a message type for the initial UE message 502, a user equipment identifier for the UE 110, quality of service definitions for the UE 110, setup parameters for the UE 110, and/or other information related to the UE 110.

FIG. 6 illustrates a flowchart depicting a method 600 and FIG. 7 illustrates a flowchart depicting a method 700 according to one or more example embodiments of the present disclosure. It will be understood that each block of the flowcharts and combination of blocks in the flowcharts can be implemented by various means, such as hardware, firmware, processor, circuitry, and/or other communication devices associated with execution of software including one or more computer program instructions. For example, one or more of the procedures described above can be embodied by computer program instructions. In this regard, the computer program instructions which embody the procedures described above can be stored, for example, by the memory 304 of the apparatus 300 employing an embodiment of the present disclosure and executed by the processing circuitry 302. As will be appreciated, any such computer program instructions can be loaded onto a computer or other programmable apparatus (for example, hardware) to produce a machine, such that the resulting computer or other programmable apparatus implements the functions specified in the flowchart blocks. These computer program instructions can also be stored in a computer-readable memory that can direct a computer or other programmable apparatus to function in a particular manner, such that the instructions stored in the computer-readable memory produce an article of manufacture the execution of which implements the function specified in the flowchart blocks. The computer program instructions can also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Referring now to FIG. 6, the operations performed, such as by the apparatus 300 of FIG. 3, in order to provide network function selection for user equipment using a network node and via a gateway network node are depicted, in accordance with one or more embodiments of the present disclosure. As shown in block 602 of FIG. 6, the apparatus 300 includes means, such as the processing circuitry 302, the memory 304, or the like, configured to receive a single-network slice selection assistance information (S-NSSAI) list from a user equipment (UE). As shown in block 604 of FIG. 6, the apparatus 300 includes means, such as the processing circuitry 302, the memory 304, or the like, configured to determine whether a network node does not support a non-access stratum node selection function for the UE. As shown in block 606 of FIG. 6, the apparatus 300 includes means, such as the processing circuitry 302, the memory 304, or the like, configured to, based on a determination that the network node does not support the non-access stratum node selection function for the UE, generate an initial UE message configured with an information element for the S-NSSAI list, and/or cause the initial UE message to be transmitted to a gateway network node to select a core network function for the UE.

In certain embodiments, the gateway network node is configured as a RAN node gateway, and the causing the initial UE message to be transmitted to the gateway network node includes causing the initial UE message to be transmitted to the RAN node gateway to select a core network function for the UE. For example, the apparatus 300 can include means, such as the processing circuitry 302, the memory 304, or the like, configured to cause the initial UE message to be transmitted to the RAN node gateway to select a core network function for the UE.

In certain embodiments, the gateway network node is configured as a Femto gateway (e.g., a 5G Femto gateway), and the causing the initial UE message to be transmitted to the gateway network node includes causing the initial UE message to be transmitted to the Femto gateway (e.g., the 5G Femto gateway) to select a core network function for the UE. For example, the apparatus 300 can include means, such as the processing circuitry 302, the memory 304, or the like, configured to cause the initial UE message to be transmitted to the Femto gateway (e.g., the 5G Femto gateway) to select a core network function for the UE.

In certain embodiments, the gateway network node is configured as a home NG-RAN node gateway, and the causing the initial UE message to be transmitted to the gateway network node includes causing the initial UE message to be transmitted to the home NG-RAN node gateway to select a core network function for the UE. For example, the apparatus 300 can include means, such as the processing circuitry 302, the memory 304, or the like, configured to cause the initial UE message to be transmitted to the home NG-RAN node gateway to select a core network function for the UE.

Referring now to FIG. 7, the operations performed, such as by the apparatus 300 of FIG. 3, in order to provide network function selection for user equipment via a gateway network node are depicted, in accordance with one or more embodiments of the present disclosure. As shown in block 702 of FIG. 7, the apparatus 300 includes means, such as the processing circuitry 302, the memory 304, or the like, configured to receive, from a radio access network (RAN) node, a first initial user equipment (UE) message configured with an information element for a single-network slice selection assistance information (S-NSSAI) list associated with a UE. As shown in block 704 of FIG. 7, the apparatus 300 includes means, such as the processing circuitry 302, the memory 304, or the like, configured to select a core network function for the UE based on the information element for the S-NSSAI list. As shown in block 706 of FIG. 7, the apparatus 300 includes means, such as the processing circuitry 302, the memory 304, or the like, configured to cause a second initial UE message to be transmitted to the selected core network function.

In certain embodiments, the selecting the core network function includes performing an NNSF for the UE based on the information element for the S-NSSAI list. For example, the apparatus 300 can include means, such as the processing circuitry 302, the memory 304, or the like, configured to perform an NNSF for the UE based on the information element for the S-NSSAI list.

In certain embodiments, the RAN node is configured as a home NG-RAN node, and the receiving the first initial UE message includes receiving the first initial UE message from the home NG-RAN node. For example, the apparatus 300 can include means, such as the processing circuitry 302, the memory 304, or the like, configured to receive the first initial UE message from the home NG-RAN node.

In certain embodiments, the RAN node is configured as a Femto base station (e.g., a 5G Femto base station), and the receiving the first initial UE message includes receiving the first initial UE message from the Femto base station (e.g., the 5G Femto base station). For example, the apparatus 300 can include means, such as the processing circuitry 302, the memory 304, or the like, configured to receive the first initial UE message from the Femto base station (e.g., the 5G Femto base station).

As described above, FIGS. 6 and 7 are flowcharts of various methods that can be carried out by, e.g., the apparatus 300, and/or according to a computer program product, according to an example embodiment of the disclosure. A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above, such as, e.g., in conjunction with the communications flowchart of FIG. 4 or as part of the system of FIG. 1 and/or FIG. 2. In other embodiments, the computer program instructions, such as the computer-readable program code portions, need not be stored or otherwise embodied by a non-transitory computer-readable storage medium, but may, instead, be embodied by a transitory medium with the computer program instructions, such as the computer-readable program code portions, still being configured, upon execution, to perform the functions described above.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments presented herein and that modifications and other embodiments are intended to be included within the scope of the appended claims. Although specific terms are employed herein, they are used in a generic and descriptive sense only and not for purposes of limitation.

What is claimed is:

1. A radio access network node for a communication network, the radio access network node comprising:
   at least one processor; and
   at least one memory storing instructions that, when executed by the at least one processor, cause the radio access network node at least to:
   receive a single-network slice selection assistance information (S-NSSAI) list from a user equipment (UE);
   determine whether the radio access network node comprises a non-access stratum node selection function (NNSF) that is configured for performing selection of an access and mobility function for the UE based on the S-NSSAI list;
   based on a determination that the radio access network node does not comprise a non-access stratum node selection function that is configured for performing selection of an access and mobility function for the UE based on the S-NSSAI list:
   generate an initial UE message comprising the S-NSSAI list; and
   transmit the initial UE message to a femto gateway, wherein the initial UE message is configured to cause the femto gateway to select an access and mobility function for the UE based on the S-NSSAI list.

2. The radio access network node of claim 1, wherein the femto gateway is between the radio access network node and a core network comprising the access and mobility network function.

3. The radio access network node of claim 1, wherein the radio access network node is configured as a home next generation radio access network (NG-RAN) node.

4. A femto gateway for a communication network, the femto gateway comprising:
   at least one processor; and
   at least one memory storing instructions that, when executed by the at least one processor, causes the femto gateway at least to:
      receive, from a radio access network (RAN) node, a first initial user equipment (UE) message comprising a single-network slice selection assistance information (S-NSSAI) list for a UE, wherein the first initial UE message is configured to cause the femto gateway to select an access and mobility function for the UE based on the S-NSSAI list;
      provide to a non-access stratum selection function of the femto gateway, the S-NSSAI list, wherein the non-access stratum function selects an access and mobility function for the UE based on the S-NSSAI list; and
      transmit a second initial UE message to the access and mobility function that is selected by the non-access stratum selection function.

5. The femto gateway of claim 4, wherein the femto gateway is to be deployed between the RAN node and the core network function.

6. The femto gateway of claim 4, wherein the RAN node is configured as a home next generation radio access network (NG-RAN) node.

7. The femto gateway of claim 4, wherein the RAN node is configured as a Femto base station.

8. A method of a radio access network node for a communication network, the method comprising:
   receiving a single-network slice selection assistance information (S-NSSAI) list from a user equipment (UE);
   based on a determination that a radio access network node does not comprise a non-access stratum node selection function for the UE:
      generating an initial UE message comprising the S-NSSAI list; and
      transmitting the initial UE message to the femto gateway network, wherein the initial UE message is configured to cause a femto gateway to select an access and mobility function for the UE based on the S-NSSAI list.

9. A method of a femto gateway of a communication network, comprising:
   receiving, from a radio access network (RAN) node of the communication network, a first initial user equipment (UE) message comprising a single-network slice selection assistance information (S-NSSAI) list for a UE, wherein the first initial UE message causes the femto cell to select an access and mobility function of the UE based on the S-NSSAI list;
   provide to a non-access stratum selection function of the femto gateway, the S-NSSAI list, the non-access stratum function selecting an access and mobility function for the UE based on the S-NSSAI list; and
   transmitting a second initial UE message to the access and mobility network function that is selected by the non-access stratum selection function.

10. The method of claim 9, wherein the RAN node is configured as a home next generation radio access network (NG-RAN) node.

11. The method of claim 9, wherein the RAN node is configured as a Femto base station.

12. The method of claim 8, wherein the femto gateway is between the radio access network node and a core network comprising the access and mobility network function.

13. The method of claim 8, wherein the radio access network node is configured as a home next generation radio access network (NG-RAN) node.

14. A radio access network comprising:
   a radio access network node comprising:
      at least one processor; and
      at least one memory storing instructions that, when executed by the at least one processor, cause the radio access network node at least to:
         receive a single-network slice selection assistance information (S-NSSAI) list from a user equipment (UE);
         determine whether the radio access network node comprises a non-access stratum node selection function (NNSF) that is configured for performing selection of an access and mobility function for the UE based on the S-NSSAI list;
         based on a determination that the radio access network node does not comprise a non-access stratum node selection function that is configured for performing selection of an access and mobility function for the UE based on the S-NSSAI list:
         generate an initial UE message comprising the S-NSSAI list; and
         transmit the initial UE message to a femto gateway, wherein the initial UE message is configured to cause the femto gateway to select an access and mobility function for the UE based on the S-NSSAI list;
   a femto gateway comprising:
      at least one processor; and
      at least one memory storing instructions that, when executed by the at least one processor, causes the femto gateway at least to:
         receive, from a radio access network (RAN) node, a first initial user equipment (UE) message comprising a single-network slice selection assistance information (S-NSSAI) list for a UE, wherein the first initial UE message is configured to cause the femto gateway to select an access and mobility function for the UE based on the S-NSSAI list;
         provide to a non-access stratum selection function of the femto gateway, the S-NSSAI list, wherein the non-access stratum function selects an access and mobility function for the UE based on the S-NSSAI list; and
         transmit a second initial UE message to the access and mobility function that is selected by the non-access stratum selection function.

* * * * *